(12) United States Patent
Hermes et al.

(10) Patent No.: US 7,893,149 B2
(45) Date of Patent: Feb. 22, 2011

(54) LIQUID-APPLIED SOUND DAMPENING

(75) Inventors: Ann R. Hermes, Ambler, PA (US); Andrew J. Swartz, Fleetwood, PA (US); Drew E. Williams, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 321 days.

(21) Appl. No.: 12/004,301

(22) Filed: Dec. 20, 2007

(65) Prior Publication Data

US 2008/0153969 A1 Jun. 26, 2008

Related U.S. Application Data

(60) Provisional application No. 60/876,430, filed on Dec. 20, 2006, provisional application No. 60/906,881, filed on Mar. 14, 2007, provisional application No. 61/002,341, filed on Nov. 8, 2007.

(51) Int. Cl.
  *C08L 85/02* (2006.01)
  *E04B 1/74* (2006.01)
(52) U.S. Cl. .................. 524/500; 524/547; 524/610; 252/62
(58) Field of Classification Search ............ 524/500, 524/547, 610; 252/62
See application file for complete search history.

(56) References Cited

U.S. PATENT DOCUMENTS

| | | | |
|---|---|---|---|
| 5,405,879 A | 4/1995 | Uemae et al. | |
| 5,618,859 A | 4/1997 | Maeyama et al. | |
| 6,492,451 B1 | 12/2002 | Dersch et al. | |
| 6,531,541 B1 | 3/2003 | Desai et al. | |
| 6,576,051 B2 | 6/2003 | Bardman et al. | |
| 6,686,033 B1 | 2/2004 | Chacko | |
| 6,846,889 B1 | 1/2005 | Nakamura et al. | |
| 6,872,761 B2 * | 3/2005 | LeStarge | 523/218 |
| 7,176,258 B2 | 2/2007 | Morihiro et al. | |
| 7,217,746 B2 | 5/2007 | Munro et al. | |
| 7,253,218 B2 * | 8/2007 | Hussaini et al. | 523/223 |
| 2004/0102568 A1 | 5/2004 | Bridgewater et al. | |
| 2004/0229962 A1 | 11/2004 | Morihiro et al. | |
| 2004/0239150 A1 | 12/2004 | Fukudome et al. | |
| 2005/0080193 A1 * | 4/2005 | Wouters et al. | 525/191 |
| 2005/0222299 A1 | 10/2005 | Garzon et al. | |
| 2006/0189734 A1 | 8/2006 | Gota et al. | |
| 2006/0189743 A1 | 8/2006 | Sophiea et al. | |
| 2006/0258790 A1 | 11/2006 | Suzuki et al. | |
| 2007/0032586 A1 | 2/2007 | Numazawa et al. | |
| 2007/0048445 A1 | 3/2007 | DiMario | |
| 2007/0048504 A1 | 3/2007 | DiMario | |
| 2007/0049697 A1 | 3/2007 | Miyawaki et al. | |
| 2007/0088121 A1 | 4/2007 | Miyawaki et al. | |

FOREIGN PATENT DOCUMENTS

| | | |
|---|---|---|
| EP | 1398333 | 3/2004 |
| EP | 1398333 A1 * | 3/2004 |
| EP | 1403347 | 3/2004 |
| JP | 3038371 | 2/1991 |
| JP | 3209499 | 9/1991 |
| JP | 3286033 | 12/1991 |
| JP | 6128492 | 5/1994 |
| JP | 6198245 | 7/1994 |
| JP | 6200196 | 7/1994 |
| JP | 7145331 | 6/1995 |
| JP | 7292318 | 11/1995 |
| JP | 9104842 | 4/1997 |
| JP | 9227795 | 9/1997 |
| JP | 10060311 | 3/1998 |
| JP | 10204370 | 8/1998 |
| JP | 10324822 | 12/1998 |
| JP | 11263894 | 9/1999 |
| JP | 2000086939 | 3/2000 |
| JP | 2001064545 | 3/2001 |
| JP | 2001152028 | 6/2001 |
| JP | 2003042223 | 2/2003 |
| JP | 2003193025 | 7/2003 |
| JP | 2003206382 | 7/2003 |
| JP | 2003227542 | 8/2003 |
| JP | 2004115665 | 4/2004 |
| JP | 2004277603 | 10/2004 |
| JP | 2005105106 | 4/2005 |
| JP | 2005126572 | 5/2005 |
| JP | 2005187514 | 7/2005 |
| JP | 2005187605 | 7/2005 |
| JP | 2005281575 | 10/2005 |
| JP | 2006249413 | 9/2006 |
| JP | 2006335918 | 12/2006 |
| JP | 2006335938 | 12/2006 |
| WO | 9906491 | 2/1999 |
| WO | 2007023819 | 3/2007 |

OTHER PUBLICATIONS

"Acrylic Modified Asphalt Vehicle Banking Coat", China Paint, No. 5, pp. 26-28, Oct. 2001.
Liu Ruiying, et al., "PS/PA LIPN damping coatings", Paint & Coatings Industry, pp. 4-6, Jun. 30, 1995 [with English Abstract and Section 3.1].

* cited by examiner

*Primary Examiner*—Michael M Bernshteyn
(74) *Attorney, Agent, or Firm*—Cantor Colburn LLP

(57) ABSTRACT

A liquid applied sound dampening composition with a binder having from 0.03% to 3% phosphorus present as copolymerized pendant phosphorus acid groups.

13 Claims, No Drawings

LIQUID-APPLIED SOUND DAMPENING

This application claims the benefit of priority under 35 U.S.C. §119(e) of U.S. Provisional Patent Application No. 60/876,430 filed on Dec. 20, 2006 and U.S. 60/906,881 filed on Mar. 14, 2007 and 61/002,341 filed on Nov. 8, 2007.

This invention relates to a composition for sound dampening, particularly useful for motor vehicle applications.

Motor vehicle manufacturers in many cases have taken steps to make vehicles that dampen sound due to vibration from road noise, engine and transmission vibration and wind. One of the most common ways to reduce vibration is asphaltic patches, which are thick patches that adhere to metallic or plastic parts of the body or frame. They are fairly effective to dampen sound, but cumbersome to use. Firstly, they are labor-intensive to install. Secondly, as each vehicle type has body and frame parts that are different from other vehicle types, the manufacturer has to make available a fairly wide variety of different sizes and shapes of patches. Even a single vehicle can use a fair number of different sizes and shapes of patches. As a result, the manufacturer has to design, provide and stock a large number of such parts, which is costly and inefficient.

Liquid-applied sound dampening materials have been developed. They have some advantages over patches, most notably in that they can be robotically installed with spray equipment, eliminating the labor associated with patch installation.

Also spray installation can allow for more focused or limited application of sound deadening material. Laser-assisted vibrational analysis of motor vehicles can identify vibrational "hot spots" (areas that vibrate more than others). With patches, it is sometimes simpler to make and install one large patch that covers several hot spots rather than making and installing several smaller patches. With computer-guided spray equipment, each hot spot can be sprayed (and dampened) individually, reducing material usage and vehicle weight.

Liquid-applied sound dampening materials that include solvent-borne epoxy or urethane-based materials have obvious drawbacks environmentally for VOC emissions, and contribute to odor issues (e.g., "new car smell").

This invention is an improved sound dampening composition comprising:

(a) a water borne polymeric binder wherein said binder comprises from 0.03% to 3% phosphorus present as copolymerized pendant phosphorus acid groups wherein the binder has a calculated Tg of between −50° C. and 80° C., preferably between −30° C. and 50° C., and more preferably between 0° C. and 30° C.;

(b) a filler, wherein on a dry weight basis the ratio of filler to polymer is from 1:1 to 10:1; and (c) a thickener in an amount sufficient to achieve a shear-thinnable composition that has a Brookfield viscosity of between 200,000-10,000,000 cP (and preferably between 1,000,000-3,000,000 cP) when not under shear conditions wherein the volume solids of the composition is between about 50 to about 75%.

In one embodiment of this invention, the binder (a) comprises two components, a first component comprising a copolymer having a calculated Tg from −50° C. to 60° C. and a second component comprising a copolymer having a calculated Tg from −30° C. to 80° and wherein the difference in Tg between the two components is at least 20° C.

With a two-component binder, one of the components can be polymerized in the presence of the other. Alternatively in a two-component binder, the binder can comprise a blend of two polymeric dispersions.

In a two-component binder the preferred difference in Tg between the two components is from 20-80° C., more preferred from 30-70° C. and most preferred from 40-60° C. The amount of each component in a two-component binder can range from 1-99%, preferably from 5-95% and more preferably from 10-90%.

The composition of this invention has improved composite loss factor ("CLF") characteristics compared to prior aqueous sound dampening materials, and virtually eliminates the issues associated with solvent-based liquid-applied sound dampening materials.

This invention further is method for reducing vibration of a motor vehicle comprising applying to one or more components of the vehicle the inventive composition described above.

By "volume solids" we mean the sum of the dry volume of filler plus the dry volume of binder, which sum is divided by the total volume of the composition, multiplied by 100.

When we refer to "(co)polymer" we refer to either a homopolymer or copolymer, or both of them in combination. We use the term "(meth)acrylate" to refer to either acrylate or methacrylate and the term "(meth)acrylic" refers to either acrylic or methacrylic.

"Glass transition temperature" or "$T_g$" is the glass transition temperature, of a copolymer calculated with the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, based on weight of monomers charged to the reaction vessel, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The glass transition temperatures of homopolymers for the purposes of this invention are those reported in "Polymer Handbook", edited by J. Brandrup and E. H. Immergut, Interscience Publishers, 1966, unless that publication does not report the $T_g$ of a particular homopolymer, in which case the $T_g$ of the homopolymer is measured by differential scanning colorimetry (DSC). To measure the glass transition temperature of a homopolymer by DSC, the homopolymer sample is prepared and maintained in the absence of ammonia or primary amine. The homopolymer sample is dried, preheated to 120° C., rapidly cooled to −100° C., and then heated to 150° C., at a rate of 20° C./minute while data is collected. The glass transition temperature for the homopolymer is measured at the midpoint of the inflection using the half-height method.

The Fox calculation of the $T_g$ for a copolymer containing crosslinking monomers as polymerized units, is based on glass transition temperatures for the homopolymers formed from each crosslinking monomer wherein the homopolymer is not in the presence of ammonia or a primary amine. The glass transition temperature values for homopolymers formed from the anionic monomers are for anionic homopolymers in the acid form.

For the case in which the emulsion (co)polymer particles are made up of two or more mutually incompatible (co) polymers, the Tg is calculated for each (co)polymer phase according to the component monomers present in each (co) polymer.

When we refer to "Brookfield viscosity," we mean the coating viscosity as measured on a Brookfield RV DV-I viscometer with a Brookfield Helipath™ stand utilizing a T-Bar type T-F spindle for coatings with viscosities between 1,000,000 and 10,000,000 cP. For coatings with viscosities between 200,000 and 1,000,000 a T-Bar type T-E spindle may be used. The speed of rotation of the spindle in both cases is 1 rpm and the spindle is run for 10 seconds before the measurement is made. The Brookfield Helipath™ stand allows the spindle to move down into the coating during rotation to ensure proper measurement of highly viscous materials.

The weight average particle diameter of the emulsion (co) polymer particles used in blending can be from 40 nanometers to 1000 nanometers, as measured using a Brookhaven BI-90 Particle Sizer. However, polymodal particle size distributions such as those disclosed in U.S. Pat. Nos. 4,384,056 and 4,539,361, hereby incorporated herein by reference, can be employed.

By "water-borne polymeric binder" we mean an aqueous, water-dispersed polymer that is substantially solvent-free. In a preferred embodiment, the sound dampening composition contains the binder in an amount of from 9 wt % to 50 wt %, preferably from 20 wt % to 45 wt %, even more preferably from 25 wt % to 40 wt %, based on solids weight percent of the treating composition. By "solids weight percent," we mean the binder solids weight divided by the total solids in the composition multiplied by 100. The binder contains a copolymer which includes from 0.03% to 3%, phosphorus present as copolymerized pendant phosphorus acid groups. By "pendant phosphorus acid group," we mean a phosphorus acid group which is covalently linked to the polymer backbone. The pendant phosphorus acid group is typically introduced through the use of a copolymerizable monomer which contains a phosphorus acid group. Suitable binders include for example a polymeric binder having as copolymerized units 55 wt % butyl acrylate, 2.6 wt % phosphoethyl methacrylate, and 42.4 wt % methyl methacrylate, prepared according the to methods of the United States Patent Application having Publication Number 2005/0222299.

The phosphorus acid monomer contains at least one ethylenic unsaturation and a phosphorus acid group. The phosphorus acid monomer may be in the acid form or as a salt of the phosphorus acid groups. Examples of phosphorus acid monomers include:

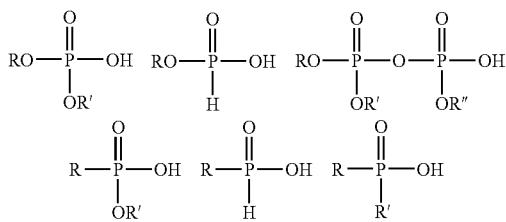

wherein R is an organic group containing an acryloxy, methacryloxy, or a vinyl group; and R' and R" are independently selected from H and a second organic group. The second organic group may be saturated or unsaturated.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl)fumarate or itaconate, derivatives of (meth)acrylic acid esters, such as, for examples phosphates of hydroxyalkyl(meth)acrylates including 2-hydroxyethyl (meth)acrylate, 3-hydroxypropyl (meth)acrylates, and the like. Other suitable phosphorus acid monomers are phosphonate-functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are 1,2-ethylenically unsaturated (hydroxy) phosphinylalkyl(meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl (meth)acrylate, 2-phosphopropyl(meth)acrylate, 3-phosphopropyl(meth)acrylate, and 3-phospho-2-hydroxypropyl (meth)acrylate.

In one embodiment of the invention, the binder polymer of this invention is prepared by first preparing a precursor polymer which contains a pendant first co-reactive group which can be reacted with a compound containing a second co-reactive group and a phosphorus acid group. Suitable first co-reactive groups on the precursor polymer are hydroxyl, epoxy, acetoacetoxy and isocyanate groups. For example one can prepare a precursor polymer using hydroxy alkyl(meth) acrylate, glycidyl(meth)acrylate, acetoacetoxy(meth)acrylate, or α,α-dimethyl meta isopropenyl benzyl isocyanate. Suitable second co-reactive groups on the compound including a second co-reactive group and phosphorus acid group are amine, hydroxyl, and phosphoric acid anhydride. Alternatively, a hydroxyl functional precursor polymer can be reacted with polyphosphoric acid to generate the organic polymer with internal pendant phosphorus acid groups. An epoxy functional precursor polymer can be reacted with polyphosphoric acid, or glyphosate to generate the organic polymer with internal pendant phosphorus acid groups. An isocyanate or acetoacetoxy functional precursor polymer can be reacted with an amine functional phosphonate such as glyphosate, to generate the organic polymer with internal pendant phosphorus acid groups.

In one embodiment of this invention, the binder copolymer may also include as copolymerized units at least one ethylenically unsaturated nonionic monomer. By "nonionic monomer" herein is meant that the copolymerized monomer residue does not bear an ionic charge between pH 1 and 14. Suitable ethylenically unsaturated nonionic monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; ureido-functional monomers; monomers bearing acetoacetate-functional groups; styrene and substituted styrenes; butadiene; ethylene, propylene, α-olefins such as 1-decene; vinyl acetate, vinyl butyrate and other vinyl esters; and vinyl monomers such as vinyl chloride, vinylidene chloride.

Amino-functional monomers may also be incorporated.

In a different embodiment of the invention, the binder may contain from 0 to 5%, by weight based on the dry weight of the binder, copolymerized ethylenically unsaturated carboxylic acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, and maleic anhydride. Preferred is 0-2% copolymerized ethylenically unsaturated carboxylic acid monomer.

In yet another embodiment of the invention, the binder may contain from 0% to 5%, by weight based on the dry weight of the binder, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

Chain transfer agents can also be used to control molecular weight. We prefer to have a molecular weight above 20,000 as determined by gel permeation chromatography.

The polymerization techniques used for preparing the two component binder, also referred to as hard-soft polymer particles with one component having a lower Tg (soft) relative to the other component having a higher Tg (hard), where one component is polymerized in the presence of the other are well known in the art. The hard-soft polymer particles are typically prepared by a multistage aqueous emulsion polymerization process, in which at least two stages differing in composition are polymerized in a sequential fashion. Multistage polymerization techniques suitable for preparing the hard-soft polymer particles are disclosed, for example, in U.S. Pat. Nos. 4,325,856, 4,654,397, and 4,814,373. In the multistage polymerization process to prepare the hard-soft polymer used in this present invention, either the soft polymer or the hard polymer is prepared as a dispersion of the first polymer particle in water, followed by the polymerization of the other polymer (the hard polymer or the soft polymer, respectively) in the presence of the first polymer particles to provide the hard-soft particles.

Examples of fillers include, but are not limited to mineral fillers such as ground and precipitated calcium carbonate, kaolin, calcined, delaminated and structured clay, titanium dioxide, aluminum silicate, magnesium silicate, wollastonite, zinc oxide, iron oxide, magnesium carbonate, amorphous silica, zinc hydroxide, aluminum oxide, aluminum hydroxide, talc, satin white, barium sulfate and calcium sulfate, and combinations of these materials. Fillers useful in this invention can also include various non-coalescing (at least at the temperatures of use) polymeric plastic fillers including, but not limited to solid bead, voided, multi-voided, binder-coated, charged, etc. and their combinations. Preferably, the filler used in this invention comprises calcium carbonate and/or mica. Calcium carbonate can be ground-type (GCC) or precipitated-type (PCC) of varying particle size, shape and morphologies.

A variety of thickeners can be used to produce a shear-thinning composition of this invention: hydrophobically-modified alkali swellable emulsions ("HASE"), hydrophobically-modified, ethoxylated urethane thickener ("HEUR"), hydroxyethyl cellulose ("HEC"). The advantage of a shear-thinning composition is that once shear is applied to the material by spraying or extruding it (for example), the viscosity drops so it can be applied in such manners. However, upon removal of the shear, the viscosity is very high so the material does not sag and stays in place once it is applied. A preferred HASE thickener is Acrysol™ TT-615 and a preferred HEUR thickener is Acrysol™ RM-12W both of which are available from the Rohm and Haas Company, Philadelphia, Pa.

The composition of this invention may optionally contain one or more compounds selected from a polyphosphate compound, or a compound of formulae (I) or (II):

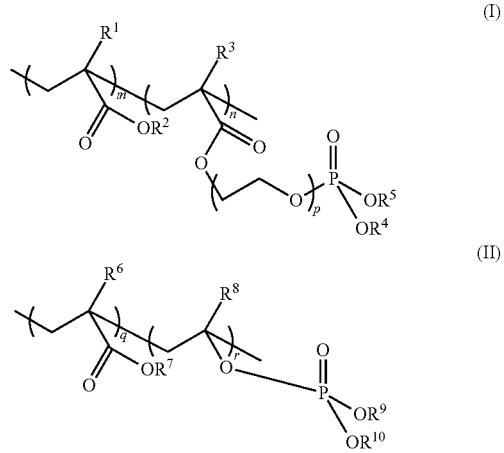

wherein R1, R3, R6, R8 are independently hydrogen or alkyl groups, R2, R4, R5, R7, R9 and R10 are independently hydrogen, alkyl groups or ammonium or metal counter ions, or wherein R5 is a residue of a phosphoethyldimethacrylate that is in turn optionally polymerized with other ethylenically unsaturated monomers or dimmers; wherein each of the sums (m+n) and (q+r) is an integer from 10 to 600, and p is an integer from 1-10; and wherein each of the ratios m:n and q:r is from 0:100 to 95:5.

Some of the polymeric structures of Formula (I) or (II) are water soluble.

By "polyphosphate compound(s)," we mean linear or cyclic polyphosphate(s) at described by Cotton et al., *Advanced Inorganic Chemistry, A Comprehensive Text*, Interscience Publishers (1972), p. 397.

Preferred compounds polyphosphates include, e.g., the acid form, or the alkali metal or ammonium salts of: pyrophosphates, tripolyphosphates, metaphosphates and polymetaphosphates for example, $(NaPO_3)_x$, such as sodium hexametaphosphate where x=6 or other similar structures with x is higher than 6. In a preferred embodiment of the invention, the sodium salts are used.

The weight ratio of the phosphorus-containing acrylic polymer binder to the polyphosphate compound(s) (and/or compounds of Formulae (I) or (II)) can preferably range from 1:0.001 to 1:2, more preferably from 1:0.01 to 1:0.5, and most preferably from 1:0.03 to 1:0.3.

Compositions of this invention can be blended together in any order in conventional fashion (e.g., using fan-blade overhead mixer). The composition can optionally be de-aerated under vacuum following blending of the ingredients.

All percentages are weight percentages, unless specified otherwise.

EXAMPLE 1

Preparation of an Aqueous Dispersion of Phosphorus-Containing Polymer Particles

A monomer emulsion was prepared by combining 576 g of deionized (DI) water, 21.1 g of dodecylbenzene sulfonate surfactant (23 weight % active), 38.6 g of an ethoxylated monoalkyl sulfosuccinate surfactant (30 weight % active), 38.6 g acrylic acid, 1255.3 g butyl acrylate, 154.8 g acrylonitrile, 425 g styrene, and 57.9 g of phosphoethyl methacrylate (50% active). To a five liter, four-neck round bottom flask equipped with stirrer and condenser, and containing 664 g DI water, 12.6 g dodecylbenzene sulfonate (23%), 1.44 g sodium sulfate, and 0.4 g of 4-hydroxy TEMPO (5% active) at 87° C. was charged 102.7 g of the monomer emulsion, followed by 5.9 g sodium persulfate dissolved in 32.4 g DI water, and rinsed to the flask with an additional 22.6 g DI water. After ten minutes, the remaining monomer emulsion and a solution of 5.9 g sodium persulfate and 8.6 g sodium hydroxide (50% active) in 203.4 g DI water were added separately to the flask over three hours. The temperature of the batch was maintained at 87° C. during the addition. When all additions were completed, the containers were rinsed to the flask with 15.2 g DI water. Separate catalyst and activator charges consisting of 14.3 g t-butyl hydroperoxide (70%) and 8.8 g sodium bisulfite in DI water were added in three portions over 90 minutes while cooling the batch to 45° C., and a neutralizer solution consisting of 42.6 g sodium hydroxide (50%) in 253.9 g DI water was added during the same period. The batch was finished off with the addition of 8.1 g Kathon LX solution (1.4% active), and 1.17 g of Drewplus T-3200 defoamer. The aqueous polymer dispersion of Example 1 contained 49 weight % solids and had a pH of 7.6. Using this procedure, latex Example 1A (Particle size ca. 130 nm) was produced.

EXAMPLES 2A-B

Coating Formulations and Composite Loss Factor

The ingredients used in the table below are Primal 308 AF (styrene-acrylate binder) available as a commercial product from the Rohm and Haas Company Philadelphia, Pa.; Foamaster Nopco NXZ obtained from Cognis; Tamol™ 850 dispersant and UCD 1530E black colorant both available from the Rohm and Haas Company; Snowhite 12 (calcium carbonate) available from Omya, Inc.; Mica 325 available from Asheville Mica Company; and Acrysol™ TT-615, a thickener (hydrophobically-modified alkali-swellable emulsion (HASE)) also available from the Rohm and Haas Company. These materials were used to make the following coating formulations.

Composite loss factor ("CLF") calculations at various temperatures were conducted following the ASTM E-756 test method with further test specifications coming from the SAE J-1637 test method for Oberst Bar testing. Dry coating weights of 3.0 kg/m² were applied for examples 2A and 2B. Dry coating weights of 2.44 kg/m² were applied for examples 2C-2H. After wet coating application, the bars were allowed to sit at room temperature for 10 minutes, followed by 20 minutes in a 150° C. oven to dry the bars. Upon cooling, the bars were measured for coating coverage and tested as mentioned above. The CLF values reported represent the average of 3 test bar specimens.

| | Example Coatings | |
|---|---|---|
| | 2A | 2B |
| Coating ingredients | | |
| Primal 308 AF | 37.34 | |
| Latex Example 1 | | 40.59 |
| Water | 3.25 | |
| Nopco NXZ | 0.04 | 0.04 |
| Tamol™ 850 | 0.80 | 0.80 |
| UCD 1530E Black | 0.94 | 0.94 |
| Snowhite 12 | 42.02 | 42.02 |
| Mica 325 | 14.00 | 14.00 |

-continued

| | | |
|---|---|---|
| Acrysol™ TT-615 | 1.61 | 1.61 |
| Coating Solids | 75% | 75% |
| Composite Loss Factor Temperature | | |
| 10.0 | 0.14 | 0.17 |
| 15.0 | 0.21 | 0.26 |
| 20.0 | 0.30 | 0.41 |
| 25.0 | 0.31 | 0.39 |
| 30.0 | 0.26 | 0.28 |
| 35.0 | 0.20 | 0.21 |
| 40.0 | 0.16 | 0.16 |

| | Example Coatings | | | | | |
|---|---|---|---|---|---|---|
| | 2C | 2D | 2E | 2F | 2G | 2H |
| Coating ingredients | | | | | | |
| Primal 308 AF | 35.71 | — | 23.30 | — | 19.60 | |
| Latex from Example 1 | — | 38.51 | — | 24.90 | — | 20.50 |
| Water | 2.80 | — | 8.80 | 7.20 | 13.00 | 12.10 |
| Nopco NXZ | 0.04 | 0.04 | 0.04 | 0.04 | 0.04 | 0.04 |
| Tamol™ 850 | 1.20 | 1.20 | 1.45 | 1.45 | 1.54 | 1.54 |
| UCD 1530E Black | 0.94 | 0.94 | 0.64 | 0.64 | 0.52 | 0.52 |
| Snowhite 12 | 52.90 | 52.90 | 63.80 | 63.80 | 67.80 | 67.80 |
| Mica 325 | 7.05 | 7.05 | 8.50 | 8.50 | 9.04 | 9.04 |
| Acrysol™ TT-615 | 1.01 | 1.01 | 0.70 | 0.70 | 0.56 | 0.56 |
| Coating Solids | 77% | 77% | 79% | 79% | 78% | 78% |
| Composite Loss Factor Temperature | | | | | | |
| 10.0 | 0.13 | 0.13 | 0.09 | 0.11 | 0.09 | 0.12 |
| 15.0 | 0.19 | 0.21 | 0.13 | 0.16 | 0.11 | 0.17 |
| 20.0 | 0.22 | 0.27 | 0.18 | 0.22 | 0.16 | 0.21 |
| 25.0 | 0.20 | 0.24 | 0.17 | 0.20 | 0.15 | 0.19 |
| 30.0 | 0.17 | 0.18 | 0.14 | 0.14 | 0.13 | 0.14 |
| 35.0 | 0.10 | 0.10 | 0.11 | 0.10 | 0.10 | 0.10 |
| 40.0 | 0.08 | 0.08 | 0.08 | 0.07 | 0.08 | 0.07 |

EXAMPLE 3

Preparation of an Aqueous Dispersion of Phosphorus-Containing Polymer Particles

A monomer emulsion was prepared by combining 969 g butyl acrylate, 34 g phosphoethyl methacrylate, 680 g methylmethacrylate, 17 g ureido methacrylate, 477 g DI water, and 18.7 g of a 60% percent by weight aqueous solution of an ammonium alkylphenoxy polyethoxy sulfate surfactant, and emulsifying with stirring. Next, 2.5 g of a 60% percent by weight aqueous solution of an ammonium alkylphenoxy polyethoxy sulfate surfactant and 1000 g DI water were charged to a five liter multi-neck flask fitted with mechanical stirring. The contents of the flask were then heated to 85° C. under a nitrogen atmosphere. To the stirred flask contents was added 92 g of the monomer emulsion followed by 2.6 g APS in 100 g DI water and followed by 1.7 g sodium carbonate in 100 g DI water. The total addition time for the monomer emulsion and a cofeed of 2.6 g APS in 100 g DI water was 210 minutes. Reactor temperature was maintained at 80° C. to 85° C. throughout the addition of the monomer mixture. Next, 60 g DI water was used to rinse the emulsion feed line to the reactor. The contents of the reactor were cooled to 65° C. Next 6.6 ppm of ferrous sulfate, 1 g t-butyl hydroperoxide, and 0.5 g D-isoascorbic acid in aqueous solutions were added to the flask. The contents of the flask were neutralized to a pH of 9.5 with ammonium hydroxide. The calculated Tg is −5° C. Using this procedure, latex Example 3 was produced.

EXAMPLES 4A-B

Coating Formulations and Composite Loss Factor

The ingredients used in the tables below are those mentioned in example 2 and sodium hexametaphosphate (Calgon-N purchased from BK Giuilini, CA, USA). These materials were used to make the following coating formulations.

EXAMPLES 4A-B

Coating Formulations and Composite Loss Factor

| Coating ingredients | 4A | 4B |
|---|---|---|
| Latex from Example 3 | 37.34 | 37.34 |
| Water | 3.25 | 3.25 |
| Calgon-N | 0.08 | 0.40 |
| Nopco NXZ | 0.04 | 0.04 |
| Tamol ™ 850 | 0.80 | 0.80 |
| UCD 1530E Black | 0.94 | 0.94 |
| Snowhite 12 | 42.02 | 42.02 |
| Mica 325 | 14.00 | 14.00 |
| Acrysol ™ TT-615 | 1.61 | 1.61 |
| Coating Solids | 75% | 75% |

| Composite Loss Factor Temperature (° C.) | 4A | 4B |
|---|---|---|
| 10.0 | 0.09 | 0.09 |
| 15.0 | 0.15 | 0.15 |
| 20.0 | 0.25 | 0.27 |
| 25.0 | 0.36 | 0.38 |
| 30.0 | 0.40 | 0.39 |
| 35.0 | 0.30 | 0.30 |
| 40.0 | 0.21 | 0.21 |

EXAMPLE 5

Preparation of Polymer

A 5 L, four necked round bottom flask was equipped with paddle stirrer, thermometer, nitrogen inlet, and reflux condenser. DI water, 961 g, was added to the kettle and heated to 84° C. under a nitrogen atmosphere. To the heated kettle water was added 2.2 g sodium salt of fatty alcohol ether sulfate, 138 g of monomer mix 3, and 5.5 g of ammonium persulfate dissolved in 55 g of DI water. Following the exotherm, the remainder of monomer mix 3 was added to the kettle at a temperature of 83° C. along with 2.35 g ammonium persulfate and 10.4 g of ammonium hydroxide in 88 g of DI water (cofeed solution). When the addition of monomer mix 3 was completed, monomer mix 4 was added to the reactor while the cofeed solution was continued. The total feed time for monomer mix 3 and monomer mix 4 was 90 minutes. Upon completion of the feeds, the batch was held for 30 minutes at 85C then 10 g of ferrous sulfate solution (0.15% in water), 1.5 g of Versene solution (1% in water), a total of 4 g t-butylhydroperoxide (70%) dissolved in 40 g water, and a total of 2.6 g of isoascorbic acid dissolved in 40 g of water were added. Ammonium hydroxide was added to raise the pH to 9.3. The final latex had a solids content of 51.2%, and an average particle size of 167 nm.

| Monomer Mix 3 | |
|---|---|
| DI Water | 285.00 |
| sodium salt of fatty alcohol ether sulfate | 25.20 |
| Butyl Acrylate | 723.90 |
| n-dodecyl mercaptan | 11.20 |
| Methyl Methacrylate | 367.60 |
| Methacrylic Acid | 22.30 |
| Monomer Mix 4 | |
| DI Water | 285.00 |
| sodium salt of fatty alcohol ether sulfate | 25.20 |
| Butyl Acrylate | 311.90 |
| n-dodecyl mercaptan | 11.20 |
| Methyl Methacrylate | 779.60 |
| Methacrylic Acid | 22.30 |

EXAMPLE 6

Preparation of Polymer

A 5 L, four necked round bottom flask was equipped with paddle stirrer, thermometer, nitrogen inlet, and reflux condenser. DI water, 961 g, was added to the kettle and heated to 84° C. under a nitrogen atmosphere. To the heated kettle water was added 2.2 g sodium salt of fatty alcohol ether sulfate, 138 g of monomer mix 1, and 5.5 g of ammonium persulfate dissolved in 55 g of DI water. Following the exotherm, the remainder of monomer mix 1 was added to the kettle at a temperature of 83° C. along with 2.35 g ammonium persulfate and 10.4 g of ammonium hydroxide in 88 g of DI water (cofeed solution). When the addition of monomer mix 1 was completed, monomer mix 2 was added to the reactor while the cofeed solution was continued. The total feed time for monomer mix 1 and monomer mix 2 was 90 minutes. Upon completion of the feeds, the batch was held for 30 minutes at 85C then 10 g of ferrous sulfate solution (0.15% in water), 1.5 g of Versene solution (1% in water), a total of 4 g t-butylhydroperoxide (70%) dissolved in 40 g water, and a total of 2.6 g of isoascorbic acid dissolved in 40 g of water were added. Ammonium hydroxide was added to raise the pH to 9.8. The final latex had a solids content of 51.3% and an average particle size of 169 nm.

| Monomer Mix 1 | |
|---|---|
| DI Water | 285.00 |
| sodium salt of fatty alcohol ether sulfate | 25.20 |
| Butyl Acrylate | 723.90 |
| n-dodecyl mercaptan | 11.20 |
| Methyl Methacrylate | 359.60 |
| Phosphoethyl methacrylate | 30.30 |
| Monomer Mix 2 | |
| DI Water | 285.00 |
| sodium salt of fatty alcohol ether sulfate | 25.20 |
| Butyl Acrylate | 311.90 |
| n-dodecyl mercaptan | 11.20 |
| Methyl Methacrylate | 771.60 |
| Phosphoethyl methacrylate | 30.30 |

EXAMPLES 7

The ingredients used in the table below are as mentioned previously as well as the materials produced in Examples 5 and 6. These materials were used to make the following coating formulations.

Composite loss factor ("CLF") calculations at various temperatures were conducted following the ASTM E-756 test method on a 1.6 mm thick bar. Dry coating weights of 4.0 kg/m² were applied for examples 7A and 7B. After wet coating application, the bars were allowed to sit at room temperature for 10 minutes, followed by 20 minutes in a 150° C. oven to dry the bars. Upon cooling, the bars were measured for coating coverage and tested as mentioned above. The CLF values reported represent the average of 3 test bar specimens.

| Coating Ingredients | Ex. 7A | Ex. 7B |
|---|---|---|
| Latex from Ex. 5 | 40.96 | |
| Latex from Ex. 6 | | 40.96 |
| Nopco NXZ | 0.04 | 0.04 |
| Tamol ™ 850 | 1.11 | 1.11 |
| UCD 1530E Black | 1.05 | 1.05 |
| Snowhite 12 | 49.16 | 49.16 |
| Mica 325 | 6.55 | 6.55 |
| Acrysol ™ TT-615 | 1.12 | 1.12 |
| Total | 100.00 | 100.00 |

| Composite Loss Factor Temperature (° C.) | Ex. 7A | Ex. 7B |
|---|---|---|
| 0.0 | 0.05 | 0.05 |
| 10.0 | 0.08 | 0.09 |
| 20.0 | 0.10 | 0.12 |
| 30.0 | 0.10 | 0.12 |
| 40.0 | 0.11 | 0.13 |
| 50.0 | 0.13 | 0.14 |
| 60.0 | 0.11 | 0.11 |

Compositions of this invention can be applied to one or more components of a motor vehicle with a spray gun powered with an air compressor using a siphon gun manually, or can be robotically applied using a dispensing robot, as is conventional in the motor vehicle industry.

We claim:

1. A composition comprising:
   (a) a water borne polymeric binder wherein said binder comprises from 0.03% to 3% phosphorus present as copolymerized pendant phosphorus acid groups wherein the binder has a calculated Tg of between −50° C. and 80° C.;
   (b) a filler, wherein on a dry weight basis the ratio of filler to polymer is from 1:1 to 10:1; and
   (c) a thickener in an amount sufficient to achieve a shear thinnable composition that has a Brookfield viscosity of between 200,000-10,000,000 cP when not under shear conditions
   wherein the volume solids of the composition is between about 50 to about 75%.

2. The composition of claim 1 wherein the binder has a calculated Tg of between −30° C. and 50° C.

3. The composition of claim 1 wherein the binder has a calculated Tg of between 0° C.-30° C. and wherein the composition has a Brookfield viscosity of from 1,000,000-3,000,000 cP.

4. The composition of claim 1 wherein the binder comprises two components, a first component comprising a copolymer having a calculated Tg from −50° C. to 60° C. and a second component comprising a copolymer having a calculated Tg from −30° C. to 80° C. wherein the difference in Tg between the two components is at least 20° C.

5. The composition of claim 4 wherein one of the components is polymerized in the presence of the other.

6. The composition of claim 4 wherein the components comprise a blend of two polymeric dispersions.

7. A method for reducing vibration of a motor vehicle comprising applying to one or more components of the vehicle a composition comprising:
   (a) a water borne polymeric binder wherein said binder comprises from 0.03% to 3% phosphorus present as copolymerized pendant phosphorus acid groups wherein the binder has a calculated Tg of between −50° C. and 80° C.;
   (b) a filler, wherein on a dry weight basis the ratio of filler to polymer is from 1:1 to 10:1; and
   (c) a thickener in an amount sufficient to achieve a shear-thinnable composition that has a Brookfield viscosity of between 200,000-10,000,000 cP when not under shear conditions
   wherein the volume solids of the composition is between about 50 to about 75%.

8. The composition of claim 1, wherein the composition has a composite loss factor of at least 0.19 at 25° C. as measured in accordance with ASTM E-756 when applied to a surface at a dry coating weight of 2.44 kg/m².

9. The composition of claim 1, further comprising one or more compounds selected from a polyphosphate compound, or a compound of formulae (I) or (II):

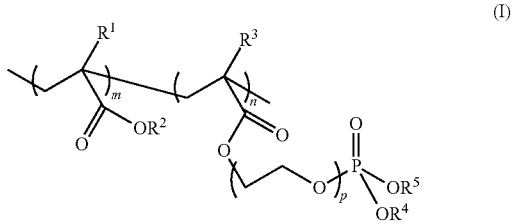

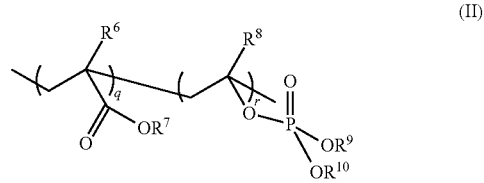

$R^1$, $R^3$, $R^6$, $R^8$ are independently hydrogen or alkyl groups, $R^2$, $R^4$, $R^5$, $R^7$, $R^9$ & $R^{10}$ are independently hydrogen, alkyl groups or ammonium or metal counter ions, or wherein $R^5$ is a residue of a phosphoethyldimethacrylate that is in turn optionally polymerized with other ethylenically unsaturated monomers or dimers; wherein each of the sums (m+n) and (q+r) is an integer from 10 to 600, and p is an integer from 1-10; and wherein each of the ratios m:n and q:r is from 0:100 to 95:5.

10. The composition of claim 1, further comprising the acid form, or the alkali metal or ammonium salt of, pyrophosphates, tripolyphosphates, metaphosphates, polymetaphosphates, or combinations thereof.

11. The composition of claim 1, wherein the filler is selected from the group consisting of ground calcium carbonate, precipitated calcium carbonate, kaolin, calcined clay, delaminated clay, structured clay, aluminum silicate, magnesium silicate, wollastonite, zinc oxide, iron oxide, magnesium carbonate, amorphous silica, zinc hydroxide, aluminum oxide, aluminum hydroxide, talc, satin white, barium sulfate, calcium sulfate, mica, a solid bead polymeric filler, a voided polymeric filler, a multi-voided polymeric filler, a binder-coated polymeric filler, a charged polymeric filler, and combinations thereof.

12. The composition of claim 1, wherein the filler is calcium carbonate, mica, or a combination of calcium carbonate and mica.

13. The composition of claim 1, wherein the thickener is present in an amount sufficient to achieve a shear thinnable composition that has a Brookfield viscosity of between 1,000,000-3,000,000 cP when not under shear conditions.

* * * * *